US006628305B1

(12) United States Patent
Hong et al.

(10) Patent No.: US 6,628,305 B1
(45) Date of Patent: Sep. 30, 2003

(54) ARCHITECTURE AND DEFINITION OF AN EXTENSIBLE, OBJECT-ORIENTED GRAPHICAL USER INTERFACE FRAMEWORK FOR MANAGING AND ADMINISTERING HETEROGENOUS DIGITAL LIBRARY DATASTORES

(75) Inventors: Christine M. Hong, San Jose, CA (US); Michael Eric Mancuso, San Jose, CA (US); Mark Joseph Sugg, Morgan Hill, CA (US); Mimi Phuong-Thao Vo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/290,848

(22) Filed: Apr. 13, 1999

Related U.S. Application Data (60) Provisional application No. 60/107,667, filed on Nov. 9, 1998.

(51) Int. Cl.[7] .................................................. G09G 5/00
(52) U.S. Cl. ...................... 345/734; 345/853; 707/102; 707/205
(58) Field of Search ................................ 345/734, 735, 345/736, 853, 854; 707/10, 102, 205; 709/230

(56) References Cited

U.S. PATENT DOCUMENTS

| 429,882 A | * | 6/1890 | Burnett ..................... 126/369.1 |
| 5,367,633 A | | 11/1994 | Matheny et al. ............ 345/764 |
| 5,369,766 A | | 11/1994 | Nakano et al. ............. 709/332 |
| 5,388,264 A | | 2/1995 | Tobias, II et al. .......... 707/103 |
| 5,446,842 A | | 8/1995 | Schaeffer et al. ........... 709/205 |
| 5,459,865 A | | 10/1995 | Heninger et al. ........... 709/108 |
| 5,519,862 A | | 5/1996 | Schaeffer et al. .............. 717/1 |
| 5,524,190 A | | 6/1996 | Schaeffer et al. ........... 707/522 |
| 5,583,983 A | * | 12/1996 | Schmitter .................... 345/705 |
| 5,613,099 A | | 3/1997 | Erickson et al. ............ 709/315 |
| 5,717,877 A | | 2/1998 | Orton et al. ................. 345/860 |
| 5,745,675 A | | 4/1998 | Herbig et al. ................. 714/38 |
| 5,751,941 A | | 5/1998 | Hinds et al. .................. 714/38 |
| 5,768,505 A | | 6/1998 | Gilchrist et al. ............ 709/201 |
| 5,778,378 A | | 7/1998 | Rubin ......................... 707/103 |
| 5,787,425 A | | 7/1998 | Bigus ............................. 707/6 |
| 5,893,106 A | * | 4/1999 | Brobst ......................... 707/102 |
| 5,963,208 A | * | 10/1999 | Dolan et al. ................ 345/760 |
| 6,031,977 A | * | 2/2000 | Pettus ......................... 709/230 |
| 6,061,515 A | * | 5/2000 | Chang et al. ................ 345/702 |
| 6,185,600 B1 | * | 2/2001 | Spence et al. .............. 709/203 |
| 6,222,533 B1 | * | 4/2001 | Notani et al. ............... 345/733 |
| 6,233,620 B1 | * | 5/2001 | Gish ........................... 709/303 |
| 6,272,521 B1 | * | 8/2001 | Jablonski et al. ........... 709/200 |
| 6,366,916 B1 | * | 4/2002 | Baer et al. ...................... 707/1 |

\* cited by examiner

Primary Examiner—Ba Huynh
(74) Attorney, Agent, or Firm—Gates & Cooper LLP (57) ABSTRACT

An extensible, object-oriented graphical user interface (GUI) framework that provides a consistent "look and feel" for an application that interfaces to the GUI framework and that manages and administers a plurality of datastores. The GUI framework is extensible by means of a "plug-in" facility through which support for additional datastores can be added, so that a collection of heterogeneous datastores can be managed using one consistent user interface.

45 Claims, 10 Drawing Sheets

ARCHITECTURE AND DEFINITION OF AN EXTENSIBLE, OBJECT-ORIENTED GRAPHICAL USER INTERFACE FRAMEWORK FOR MANAGING AND ADMINISTERING HETEROGENOUS DIGITAL LIBRARY DATASTORES

CROSS-REFERENCE TO RELATED APPLICATION

This application claims the benefit under 35 U.S.C. §119(e) of co-pending and commonly-assigned U.S. Provisional application Ser. No. 60/107,667, filed on Nov. 9, 1998, by Christine M. Hong, Michael E. Mancuso, Mark J. Sugg, and Mimi P. Vo, entitled "ARCHITECTURE AND DEFINITION OF AN EXTENSIBLE OBJECT-ORIENTED GRAPHICAL USER INTERFACE FRAMEWORK FOR MANAGING AND ADMINISTERING HETEROGENEOUS DIGITAL LIBRARY DATASTORES", which application is incorporated by reference herein.

BACKGROUND OF THE INVENTION

1. Field of the Invention

The present invention is directed in general to graphical user interfaces, and more particularly to a graphical user interface for managing and administering hetereogenous Digital Library datastores.

2. Description of Related Art

A heterogeneous Digital Library datastore usually provides Library Server functions as well as Object Server functions, wherein these functions execute on one or more network server nodes. A Library Server typically supports a high-level content model, handles access control, manages transactions, and performs other functions. An Object Server, on the other hand, supports a large, scaleable repository of objects which are components of the high-level content model maintained by Library Server.

Often, a systems administrator may need to manage several heterogeneous Digital Library datastores. This task can be made easier using an Systems Administration program that interfaces to each of the heterogeneous Digital Library datastores. Moreover, this task can be made easier through use of a consistent user interface.

As a result, there is a need in the art of a System Administration program that easily interfaces to multiple heterogeneous digital libraries. In addition, there is a need in the art for a consistent user interface used across multiple heterogeneous digital libraries. Moreover, the architecture of such a System Administration program should be modular and extensible, so that additional types of datastores can be added without disrupting existing systems.

SUMMARY OF THE INVENTION

To overcome the problems discussed above, and to overcome other problems in the art, the present invention discloses a method, apparatus, and article of manufacture for an extensible, object-oriented graphical user interface (GUI) framework that provides a consistent "look and feel" for an application that interfaces to the GUI framework and that manages and administers a plurality of datastores. The GUI framework is extensible by means of a "plug-in" facility through which support for additional datastores can be added, so that a collection of heterogeneous datastores can be managed using one consistent user interface.

BRIEF DESCRIPTION OF THE DRAWINGS

Referring now to the drawings in which like reference numbers represent corresponding elements throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention provides an architecture and definition of an extensible, object-oriented graphical user interface (GUI) framework for managing and administering heterogeneous Digital Library datastores. This invention provides a consistent "look and feel" for a Systems Administration Program or other application. The GUI framework is extensible by means of a "plug-in" facility, through which support for additional types of datastores can be added, so that a collection of heterogeneous datastores can be managed using one consistent interface. Specifically, the GUI framework includes the following components that provide the flexibility of designing new interfaces:

a collection of menu choices for selecting datastore command options, a group of toolbar buttons to manage the view of containers, a tree component to display data hierarchy, a container for viewing data associated with a given tree node, a component for developing an integrated on-line help system, and a component for developing a consistent set of message boxes.

The GUI framework manages the behavior of all the components to provide a consistent look and feel across the whole design. Each tree node or container in the framework is an object that encapsulates its own set of properties and actions, thereby giving the interface its object-oriented behavior. Moreover, a set of application programming interface (API) is provided in the GUI framework to allow a high degree of customization.

Hardware and Software Environment

Figure 1:
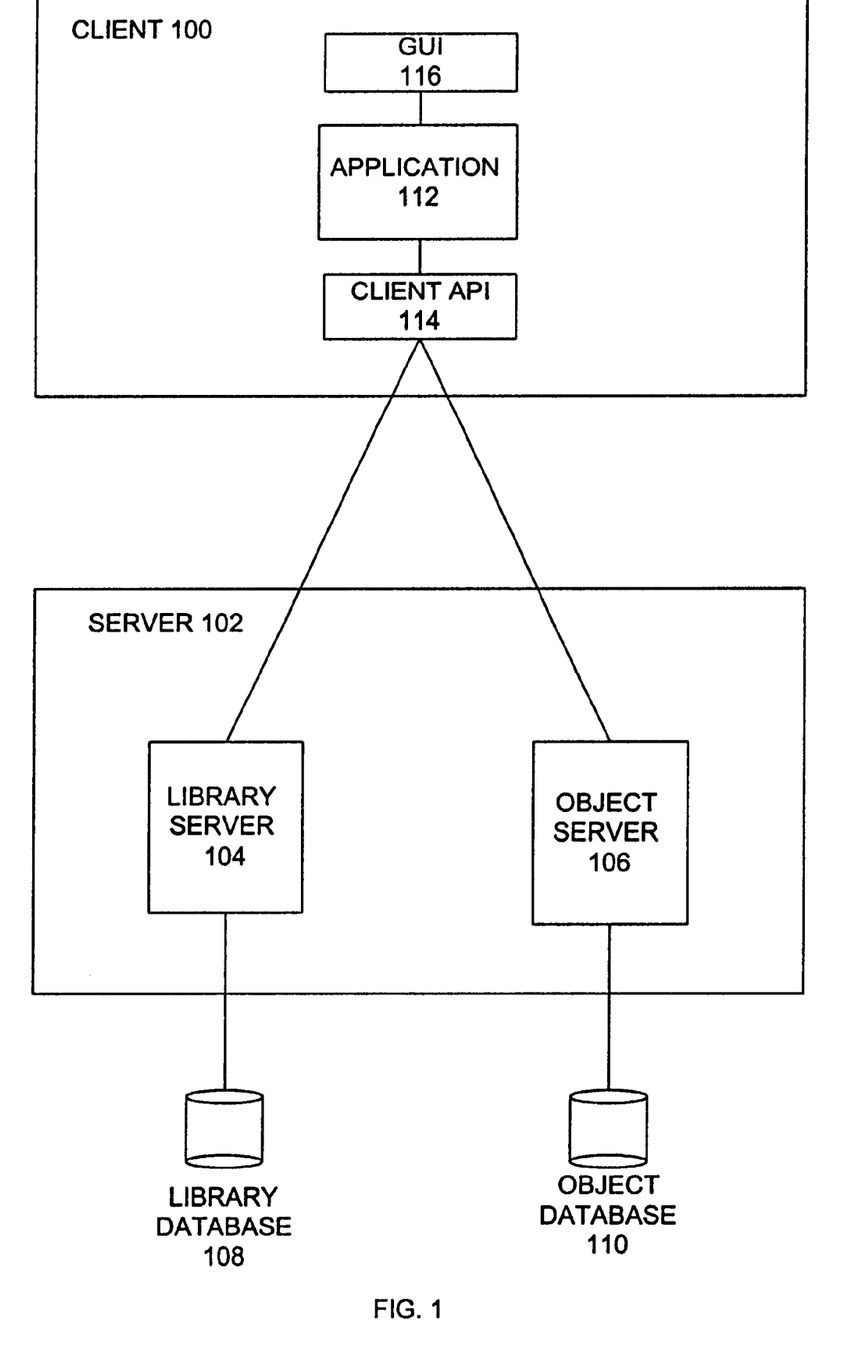
FIG. 1 is a block diagram that illustrates an exemplary hardware and software environment used to implement the preferred embodiment of the invention.

FIG. 1 is a block diagram that illustrates an exemplary hardware and software environment used to implement the preferred embodiment of the invention. The present invention comprises a Digital Library system that is typically implemented using at least one client computer 100 and/or at least one server computer 102. Both the client computers 100 and server computers 102 generally include, inter alia, one or more processors, random access memory (RAM), data storage devices, data communications devices, and other peripherals. Those skilled in the art will recognize that any combination of the above components, or any number of different components, peripherals, and other devices, may be used with either the client computers 100 or server computers 102.

The present invention is generally implemented using inter-related computer programs executed by both the client computers 102 and server computers 102. These computer programs include at least one Library Server 104 and at least one Object Server 106 (which may or may not be executed by the same server computer 102), wherein the Library Server 104 manages a Library Database 108, the Object Server 106 manages an Object Database 110, and the combination of server and database is known as a datastore. The Library and Object Servers 104 and 106 usually communicate indirectly with an Application 112 via at least one Client API 114. The Application 112 usually communicates with users via a Graphical User Interface (GUI) Framework 116. More information concerning each of the above-identified components is provided below.

All of the computer programs are comprised of instructions which, when read and executed by a computer, cause the computer to perform the steps necessary to implement and/or use the present invention. Generally, the computer programs are tangibly embodied in and/or are readable from a device, carrier, or media, such as memory, data storage devices, and/or remote devices coupled to the computer via data communications devices.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass computer programs accessible from any computer-readable device, carrier, or media.

Those skilled in the art will also recognize that the exemplary environment illustrated in FIG. 1 is not intended to limit the present invention. Further, those skilled in the art will recognize that other alternative hardware and software environments may be used without departing from the scope of the present invention.

Library Server

The Library Server 104 maintains the contents of the Library Database 108 and provides data integrity by performing a number of different functions: managing the tuples, tables, and other data structures of the Library Database 108, maintaining index information; and controlling access to objects stored in the Object Database 110 managed by the Object Server 106. The Library Server 104 is typically built upon relational database management system (RDBMS) technology, such as the DB2™ product offered by IBM Corporation.

Object Server

Each Object Server 106 is associated with a Library Server 104 and maintains objects in the Object Database 110 that are referenced by tables maintained in the Library Database 108 by the Library Server 104. This combination of relational data and object data is generally termed a "Digital Library." The Object Server 106 receives requests from the Application 112 via the Library Server 104 and then communicates the results from those requests to the Application 112 via the Client API 114.

Client API

The Client API 114 provides the functions necessary for the Application 112 to interact with the Library Server 104 and the Object Server 106. Using the Client API 114, the Application 112 can command the Library Server 104 and Object Server 106 to perform Digital Library functions, including storing relational and object data, indexing relational and object data, processing relational and object data, retrieving relational and object data, deleting relational and object data, etc.

Application

In the preferred embodiment, the Application 112 comprises a System Administration Program that permits configuration of the Digital Library system. Such a System Administration Program may configure both hardware and software resources in the system, control the level of access that end-users have to the system, and provide other administrative functions.

GUI Framework

Figure 2:
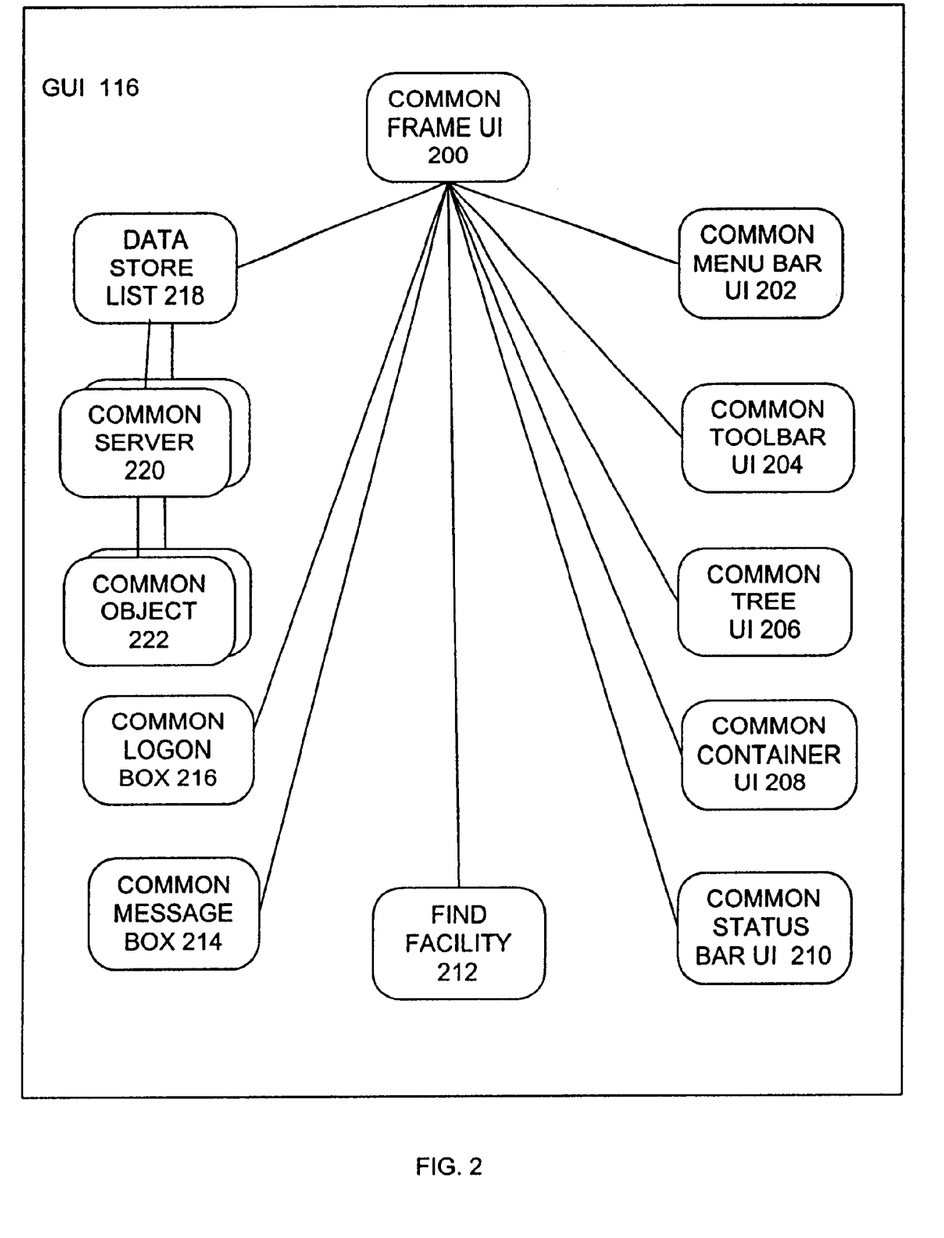
FIG. 2 is a block diagram that describes the components and sub-components of the graphical user interface framework according to the preferred embodiment of the present invention.

FIG. 2 is a block diagram that describes the components and sub-components of the GUI Framework 116 according to the preferred embodiment of the present invention. The GUI Framework 116 is comprised of a Common Frame User Interface (UI) 200 that provides a consistent look and feel between different Applications 112 that interface to the GUI Framework 116, as well as different datastores accessed by the Applications 112.

In the preferred embodiment, the components and sub-components of the Common Frame User Interface (UI) 200 are implemented as class specifications using, for example, Java™ Foundation Classes (JFC), and then are instantiated as objects during execution. As a result, the GUI Framework 116 is extensible, because multiple sets of such objects can be instantiated, i.e., for each of the datastores, thereby providing a "plug-in" facility through which support for additional datastores can be added. Moreover, the GUI Framework 116 provides a consistent "look and feel" for each of the multiple datastores, because the same class specifications are used for the different datastores.

The Common Frame UI 200 is an aggregation of the following sub-components:

A customizable menu bar (Common Menu Bar UI 202).
A customizable toolbar (Common Toolbar UI 204).
A tree view (Common Tree UI 206).
A container view (Common Container UI 208).
A status bar (Common Status Bar UI 210).
Find facilities (Find Facility 212).
A message box (Common Message Box 214)

A logon box (Common Logon Box 216).

A list of datastores accessible from the Application 112 (Datastore List 218).

The Common Menu Bar UI 202 provides a mechanism for the Application 112 to modify a default menu bar of the GUI Framework 116. The default menu bar of the GUI Framework 116 provides the following standard menus and menu items:

File: Open, Close, Exit.

Edit: Cut, Copy, Paste

View: Icon View, Detail View, Sort Ascending, Sort Descending, Refresh.

Help: Contents, Index, About.

A comprehensive set of APIs within the Common Menu Bar UI 202 are available to the Application 112 to add, remove, insert, enable, and/or disable menus or menu items.

The Common Toolbar UI 204 provides a mechanism for the Application 112 to modify a default toolbar of the GUI Framework 116. The Common Toolbar UI 204 supports any number of buttons which can be used to provide quick access to any frequently used operation the given datastore supports, e.g., adding users or user groups. The same object can be used for the action of the menu item providing the same function. For example, if there is a menu item for creating a "new user" and there is a toolbar button that provides quick access to this function, then the same object that is used for the menu item's action can also be used for the "new user" toolbar button.

The Common Tree UI 206 provides a mechanism for the Application 112 to display a tree view of zero or more datastores, including any resources therein.

The tree view, which is similar to the display of the Microsoft Windows™ Explorer, offers the following functions:

Expand/Collapse a tree node.

Display expanded/collapsed state of the current tree node.

Display number of children nodes.

Display parent node.

Display root object.

Display selected node.

Search for a tree node from a given node or from the root node.

The Common Container UI 208 provides a mechanism for the Application 112 to display a container view of a selected tree node from the Common Tree UI 206. Generally, the Common Container UI 208 includes the following functions:

Expand a container view.

Refresh a container view.

Reload a container view.

Search for an item by name.

Sort the container view in ascending or descending order.

Set the container view to detail or icon.

Select items in the container view.

Generally, the Common Container UI 208 is displayed side-by-side with the Common Tree UI 206 and responds to operations performed therein, as well as operations performed within the Common Container UI 208. For example, when the user selects a tree node in the Common Tree UI 206, the Common Container UI 208 is refreshed with the contents of the selected tree node, e.g., its children objects. On the other hand, when the user selects any item in the container view, the item to be selected and its specific menu (if any) to be added to the Common Frame UI 200.

The Common Status Bar UI 210 provides a mechanism for the Application 112 to display a status of an operation being performed by the Application 112, Server 104 or 106, or other entity. Specifically, the Common Status Bar UI 210 contains a progress bar for the operation.

The Find Facility 212 provides a mechanism for the Application 112 to search for nodes, containers, etc. Generally, the Find Facility 212 is activated via a text entry field, which allows the user to enter a search word or phrase, and thereafter initiates the search within the node selected from the Common Tree UI 206 upon selection of a "Find" button The Common Message Box 214 provides a common message box that can be used by the Application 112 to display errors, information or warnings, with each type of message; having it is own icon. The dialog also provides a variety of button options, e.g., OK/Cancel, OK/Cancel/Help, Retry/Cancel, Yes/No, Yes/No/Help.

The Common Logon Box 216 provides a common logon dialog box for different datastores that can be used by the Application 112 to enter user ids and passwords for the datastores.

The Datastore List 218 provides a mechanism for the Application 112 to maintain a list of zero or more connected datastores. Each datastore is represented by a Common Server 220. Each Common Server 220 has its own menu bar, toolbar, tree, and container view within the Common Frame UI 200. For example, when the user switches between Common Servers 220, the Common Frame UI 200 automatically saves the state of the displayed menu bar, toolbar, tree, and container view, as well as user-selected sort order, before displaying the newly selected Common Server 220.

Each Common Server 220 is comprised of zero or more Common Objects 222 that represent the various resources within the datastores. For example, a Common Object 222 may represent a table, an object, a folder, a catalog, etc.

The Common Object 222 represents a display entity within both the Common Tree UI 206 and Common Container UI 208 of the Common Frame UI 200. Each Common Object 222 includes at least the following attributes:

name (empty by default), description (empty by default), image (null by default), selected image (same as regular image unless defined), open image (same as regular image unless defined), parent object (null by default), font (default is 12 point SansSerif), text color (default is black), leaf (default value is true, i.e., the default object is a "container" object; otherwise, it is a folder object), and last tree node (default value is false).

Since the "Selected" menu in the Common Frame UI 200 is varied depending on which Common Object in the Common Tree UI 206 or Common Container UI 208 is selected, the Common Object 222 contains three (3) additional lists of information associated with the "Selected" menu of the Common Frame UI 200:

list of Common Object 222 specific menu items, list of shortcut keys corresponding to the specific menu items, and list of action listeners for menu items.

Operation of the Preferred Embodiment

FIGS. 3A, 3B, 3C, and 3D further illustrate the operation of the preferred embodiment of the present invention.

Figure 3A:
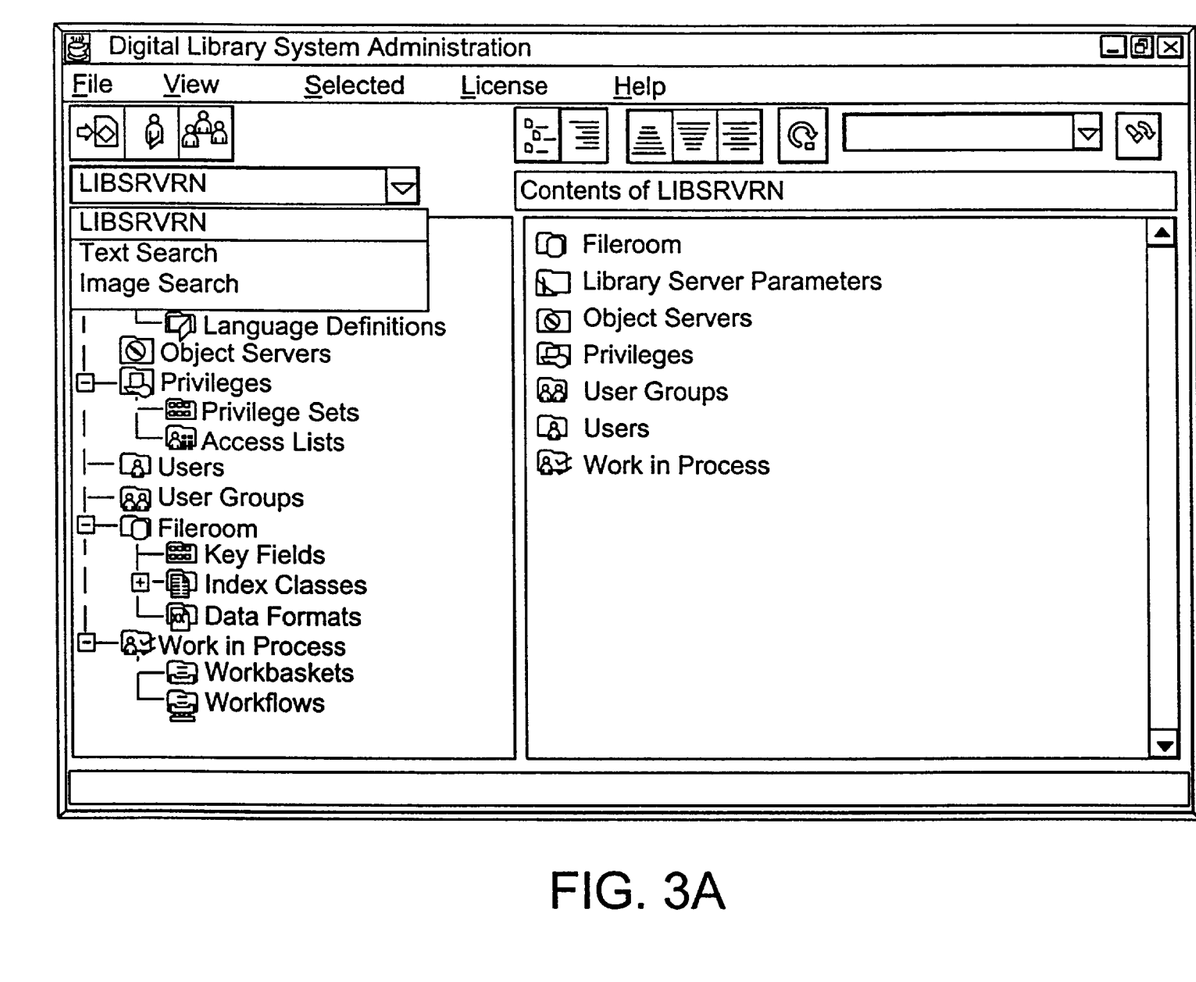
FIGS. 3A, 3B, 3C, and 3D further illustrate the operation of the preferred embodiment of the, present invention.

FIG. 3A illustrates the Common Frame UI 200, including both a Common Tree UI 206 (the left pane) and Common Container UI 208 (the right pane). The Server List 218 is shown as a combo-box above the left pane. This window shows multiple datastores available to the Application 112 using the GUI framework 118, wherein the Library Server 104 datastore known as "LIBSRVRN" s selected from the Server List 218.

Figure 3B:
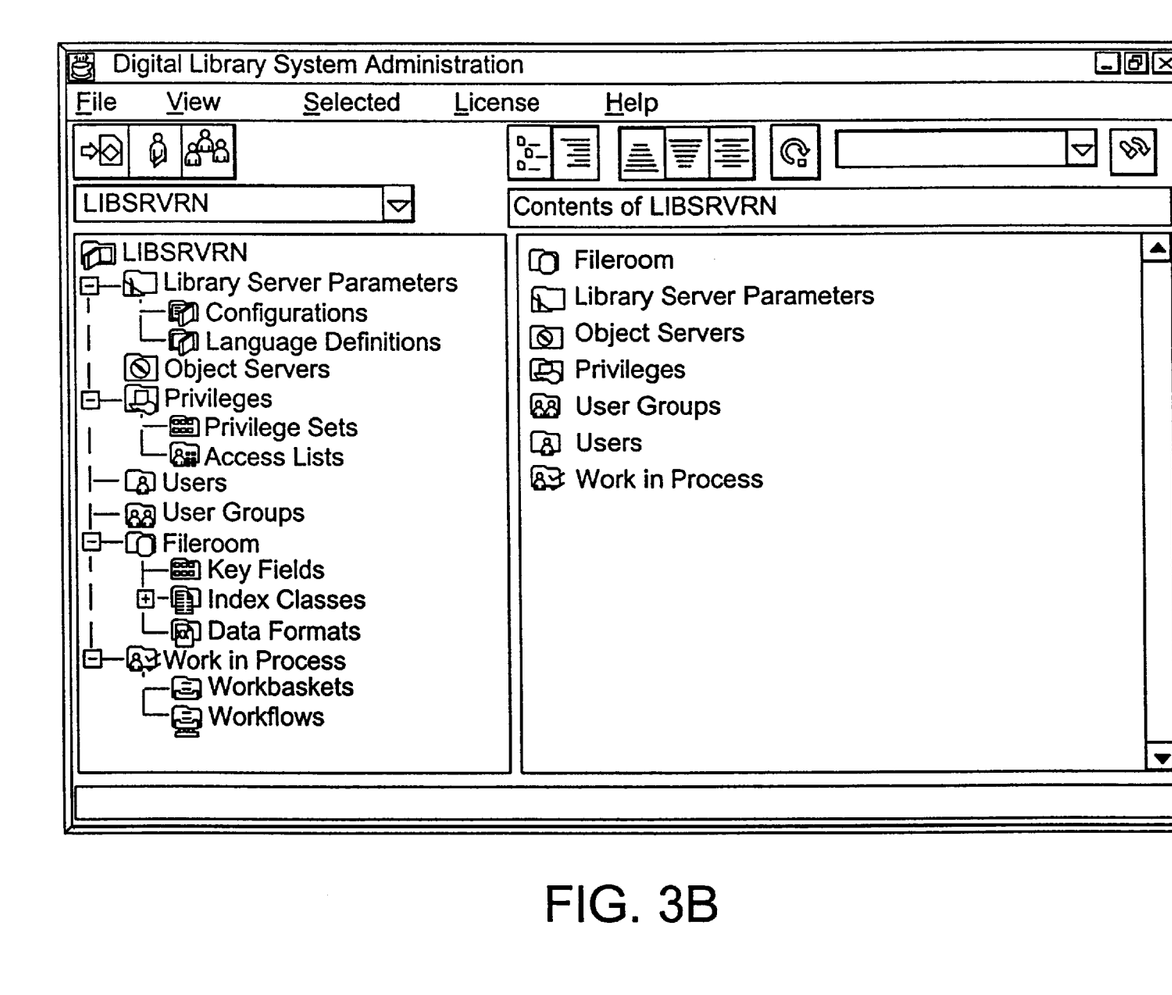

FIG. 3B is an expanded tree view (Common Tree UI 206) in the left pane of the window and a detailer container view (Common Container UI 208) in the right pane of the window. This window shows the Library Server 104 datastore "LIBSRVRN".

Figure 3C:
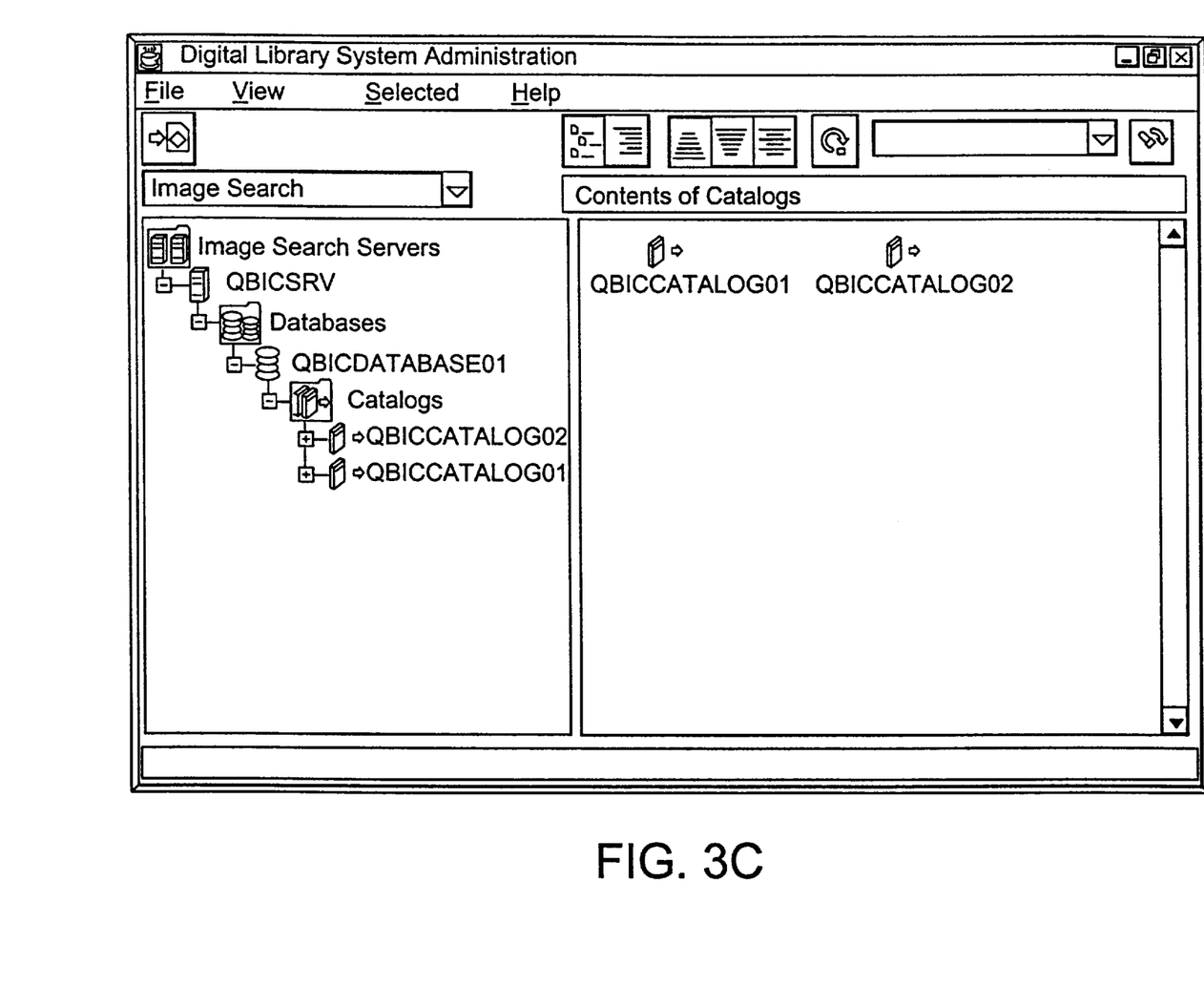

FIG. 3C illustrates the Common Frame UI 200, including both a Common Tree UI 206 (the left pane) and Common Container UI 208 (the right pane), for the "Image Search" datastore selected from the Server List 218 above the left pane, wherein QBIC is an acronym for "Query by Image Content". This is a datastore that has very different hierarchical data than the Library Server 104 datastore shown in FIGS. 3A and 3B.

Figure 3D:
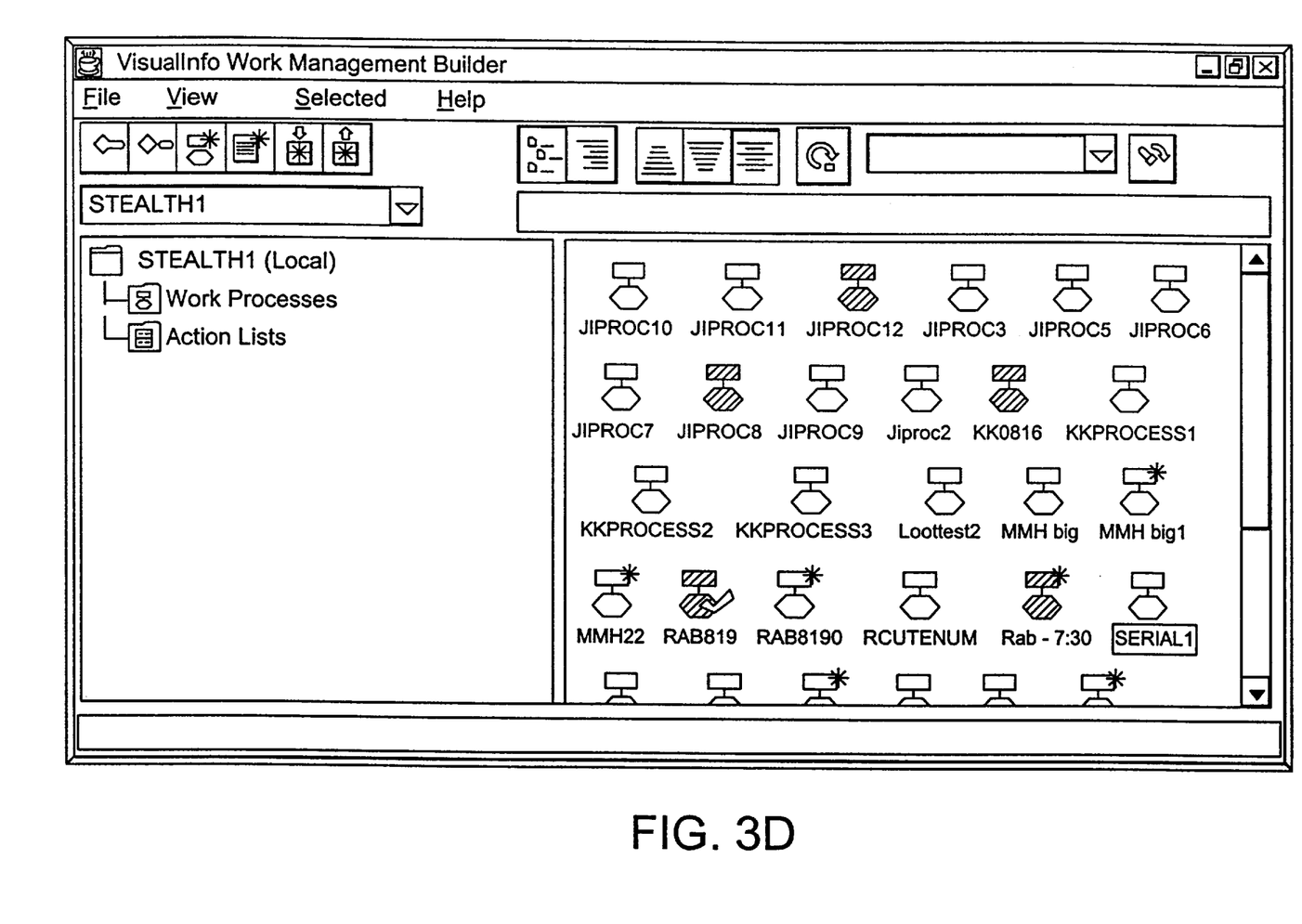

FIG. 3D illustrates a VisualInfo™ Work Management Builder Application 112 using the GUI Framework 116.

Logic of Preferred Embodiment

Figure 4:
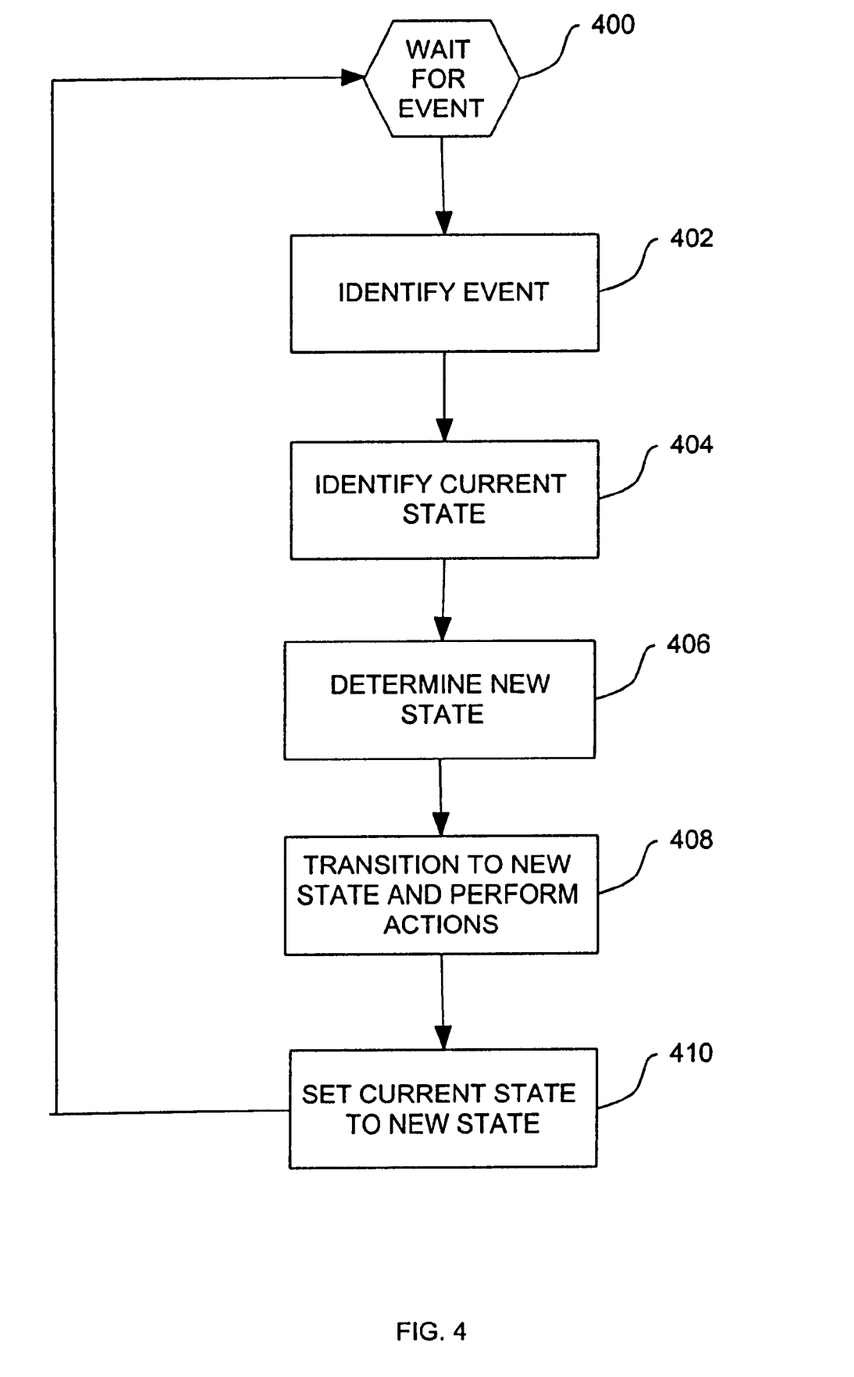
FIG. 4 is a flowchart that illustrates the general logic of a message or event-driven application performing the steps of the preferred embodiment of the present invention.

FIG. 4 is a flowchart that illustrates the general logic of a message or event-driven Application 112 performing the steps of the preferred embodiment of the present invention. In such an Application 112, operations are performed when transitions are made, based upon the receipt of messages or events, from present or current states to new states.

Generally, the flowchart begins by waiting at block 400 for an event (e.g., a mouse button click, etc.). It should be appreciated that during this time, other tasks, e.g., file, memory, and video tasks, etc., may also be carried out by the computer. When an event occurs, control passes to block 402 to identify the event. Based upon the event, as well as the current state of the system determined in block 404, a new state is determined in block 406. In block 408, the logic transitions to the new state and performs any actions required for the transition. In block 410, the current state is set to the previously determined new state, and control returns to block 400 to wait for more input events.

The specific operations that are performed by block 408 when transitioning between states will vary depending upon the current state and the event. The various operations required to implement and maintain the preferred embodiment of the present invention represent particular events handled by the logic. However, it should be appreciated that these operations represent merely a subset of all of the events handled by the computer.

Figure 5:
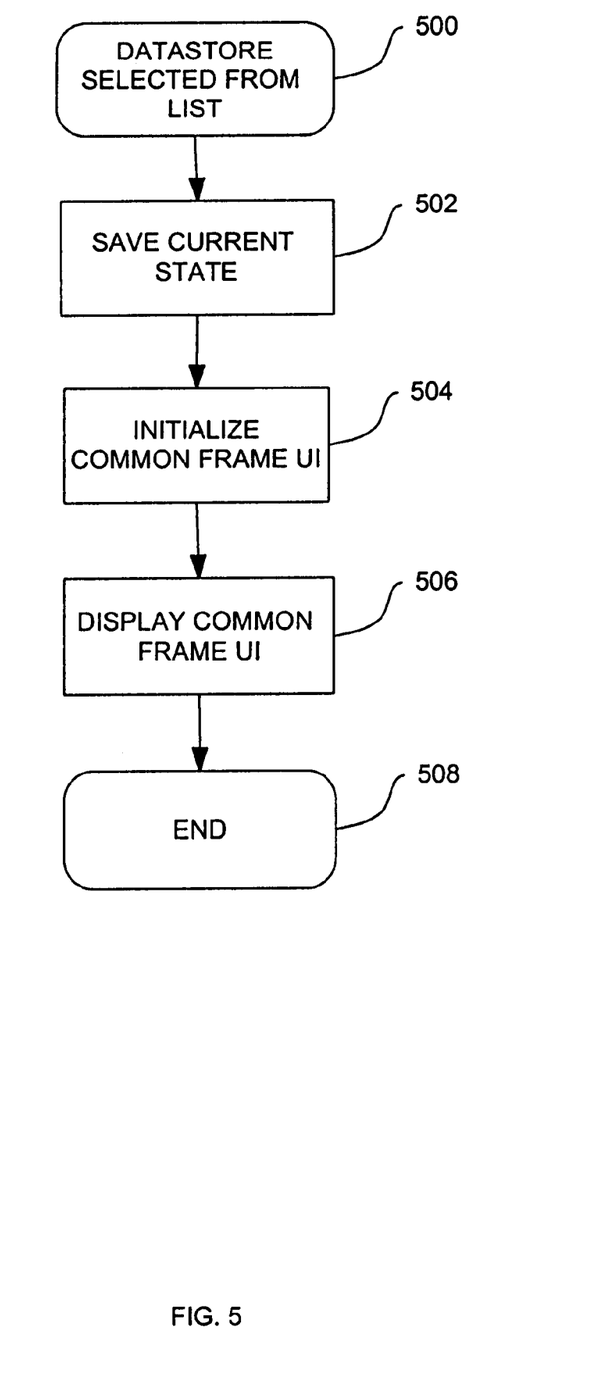
FIG. 5 is a flowchart showing the steps performed by the application when a datastore is selected from the datastore list according to the preferred embodiment of the present invention.

FIG. 5 is a flowchart showing the steps performed by the Application 112 when a datastore is selected from the Datastore List 218 according to the preferred embodiment of the present invention.

Block 500 represents the start of the function, which occurs when the user selects a Common Server 220 from the Server List 218. The selection function may be invoked via keyboard commands, mouse commands, selection of combo-box items, or any number of other ways.

Block 502 represents the Application 112 saving the current state of the Common Frame UI 200.

Block 504 represents the Application 112 initializing the Common Frame UI 200 for the selected Common Server 220. This initialization includes initializing the Common Menu Bar UI 202, Common Toolbar UI 204, Common Tree UI 206, Common Container UI 208, Common Status Bar UI 210, etc.

Block 506 represents the Application 112 displaying the Common Frame UI 200.

Block 508 represents the end of the logic.

Figure 6A:
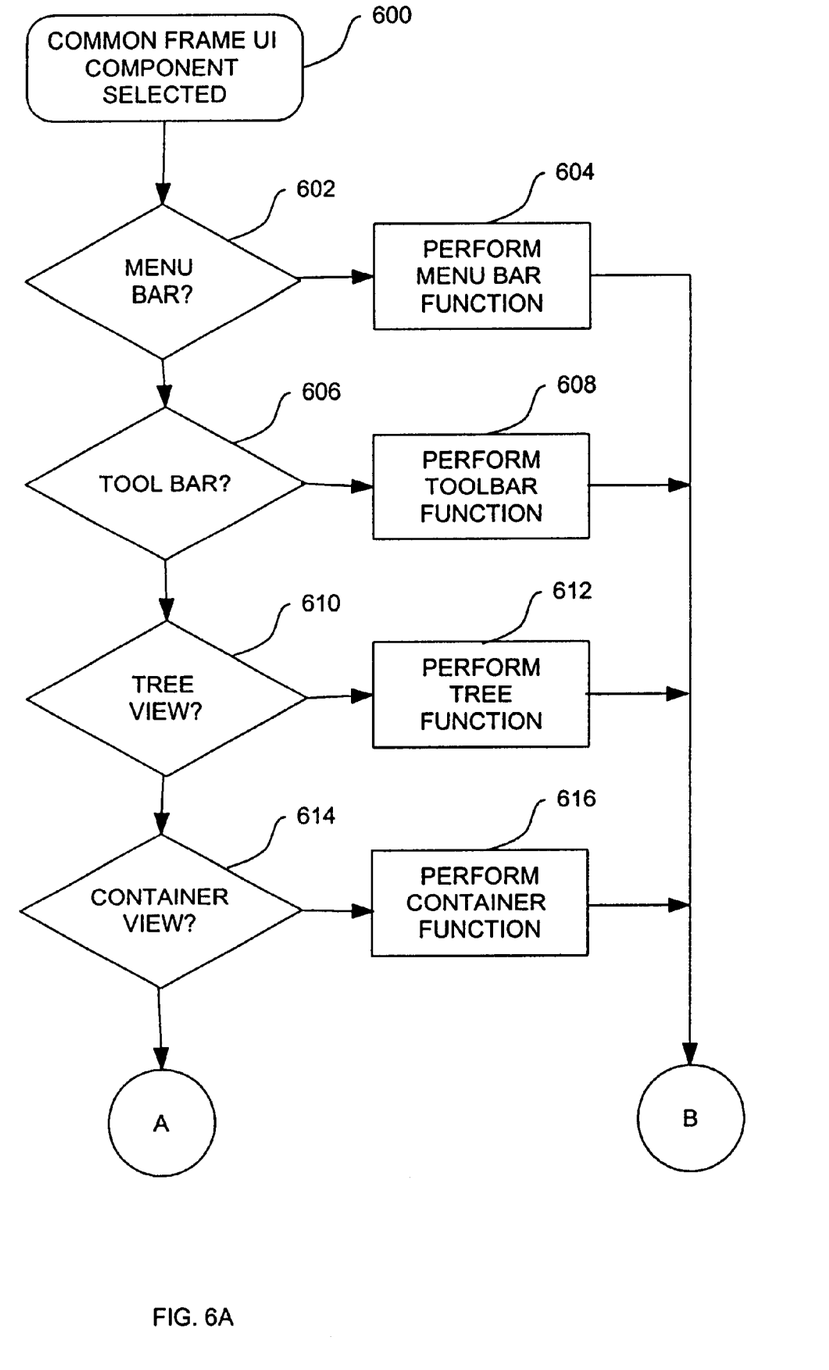
FIGS. 6A and 6B together are a flowchart showing the steps performed by the application during the display of a common frame user interface for a selected datastore according to the preferred embodiment of the present invention.
Figure 6B:
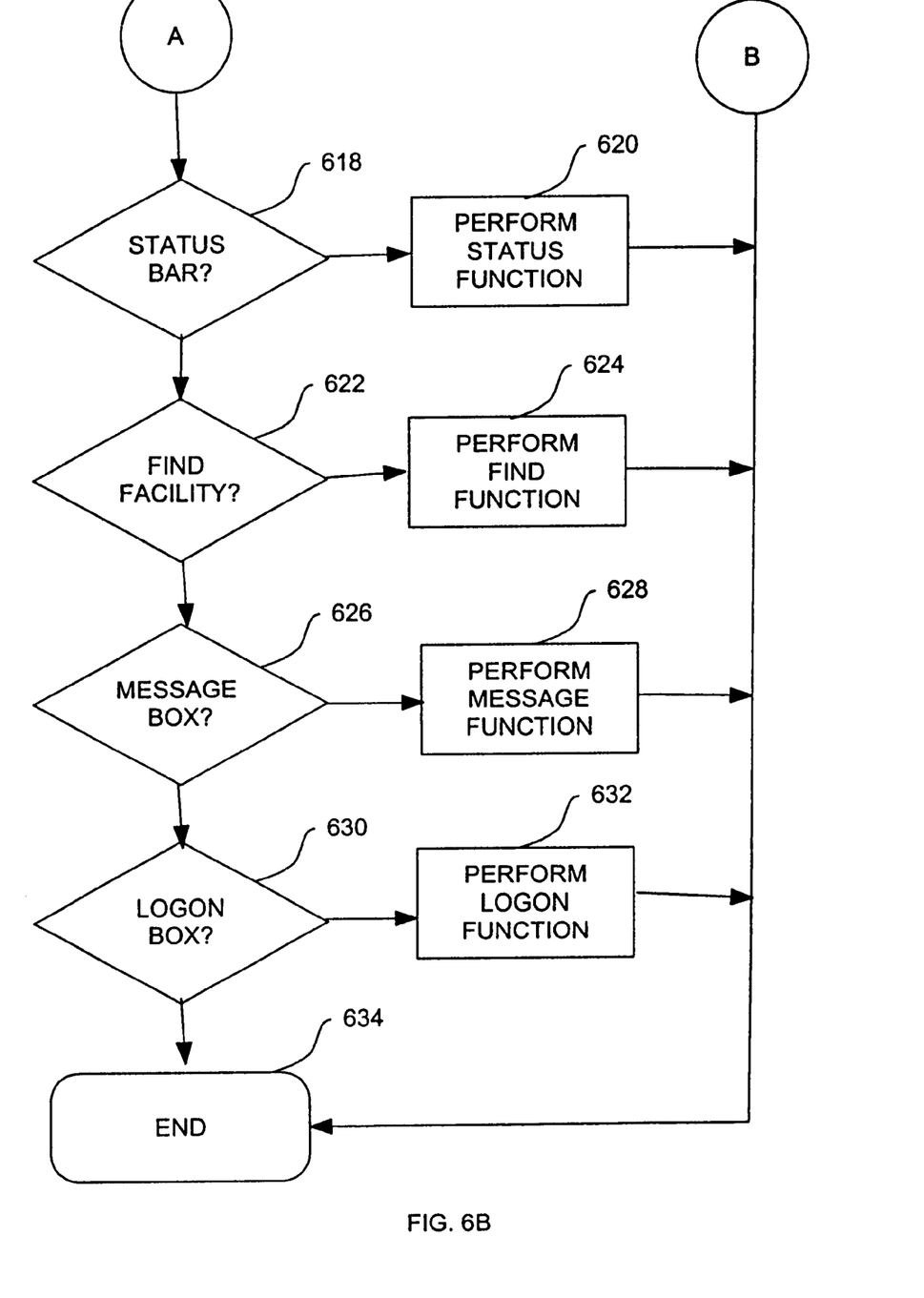

FIGS. 6A and 6B together are a flowchart showing the steps performed by the Application 112 during the display of a Common Frame UI 200 for a selected datastore.

Block 600 represents the start of the function, which occurs when the user selects a component of the Common Frame UI 200. The selection function may be invoked via keyboard commands, mouse commands, selection of combo-box items, or any number of other ways.

Block 602 is a decision block that represents the Application 112 determining whether the component selected was a component of the Common Menu Bar UI 202 of the Common Frame UI 200. If so, control transfers to Block 604 to perform the desired menu bar functions; otherwise, control transfers to Block 606.

Block 606 is a decision block that represents the Application 112 determining whether the component selected was a component of the Common Toolbar UI 204 of the Common Frame UI 200. If so, control transfers to Block 608 to perform the desired toolbar functions; otherwise, control transfers to Block 610.

Block 610 is a decision block that represents the Application 112 determining whether the component selected was a component of the Common Tree UI 206 of the Common Frame UI 200. If so, control transfers to Block 612 to perform the desired tree view functions; otherwise, control transfers to Block 614.

Block 614 is a decision block that represents the Application 112 determining whether the component selected was a component of the Common Container UI 208 of the Common Frame UI 200. If so, control transfers to Block 616 to perform the desired container view functions; otherwise, control transfers to Block 618.

Block 618 is a decision block that represents the Application 112 determining whether the component selected was a component of the Common Status Bar UI 210 of the Common Frame UI 200. If so, control transfers to Block 620 to perform the desired status bar functions; otherwise, control transfers to Block 622.

Block 622 is a decision block that represents the Application 112 determining whether the component selected was a component of the Find Facility 212 of the Common Frame UI 200. If so, control transfers to Block 624 to perform the desired find functions; otherwise, control transfers to Block 626.

Block 626 is a decision block that represents the Application 112 determining whether the component selected was a component of the Common Message Box 214 of the Common Frame UI 200. If so, control transfers to Block 628 to perform the desired message box functions; otherwise, control transfers to Block 630.

Block 630 is a decision block that represents the Application 112 determining whether the component selected was a component of the Common Logon Box 216 of the Common Frame UI 200. If so, control transfers to Block 632 to perform the desired logon functions; otherwise, control transfers to Block 634.

Block 634 represents the end of the logic.

Conclusion

This concludes the description of the preferred embodiment of the invention. The following describes some alternative embodiments for accomplishing the present invention.

For example, any type of computer, such as a mainframe, minicomputer, workstation or personal computer, could be used with the present invention. Further, the computers may or may not be network-connected, and a client-server arrangement is not a requirement to practice the current invention. In addition, any software program, application or operating system having a user interface could benefit from the present invention.

In summary the present invention discloses a method, apparatus, and article of manufacture for an extensible, object-oriented graphical user interface (GUI) framework that provides a consistent "look and feel" for an application that interfaces to the GUI framework and that manages and administers a plurality of datastores. The GUI framework is extensible by means of a "plug-in" facility through which support for additional datastores can be added, so that a collection of heterogeneous datastores can be managed using one consistent user interface.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A graphical user interface for managing and administering a plurality of heterogeneous datastores, comprising an extensible, object-oriented graphical user interface (GUI) framework for providing a consistent look and feel for an application that interfaces to the GUI framework and manages and administers the plurality of heterogeneous datastores, and for providing a consistent look and feel for the plurality of heterogeneous datastores accessed by the applications, wherein the GUI framework is extensible by means of a plug-in facility in the GUI framework through which support for additional datastores can be added, so that the plurality of heterogeneous datastores can be aged using one consistent user interface and wherein the GUI framework includes a list of datastores accessible from the application and the datastore list provides a mechanism for the application to maintain a list of zero or more connected datastores.

2. The graphical user interface of claim 1, wherein die GUI framework further includes one or more components selected from a group comprising:

(1) a customizable menu bar,
    (2) a customizable toolbar,
    (3) a tree view,
    (4) a container view,
    (5) a status bar with optional progress bar, and
    (6) find facilities for searching the containers.

3. The graphical user interface of claim 2, wherein the menu bar provides a mechanism for the application to modify a default menu bar of the GUI framework.

4. The graphical user interface of claim 2, wherein the toolbar provides a mechanism for the application to modify a default toolbar of the GUI framework.

5. The graphical user interface of claim 2, wherein the tree view provides a mechanism for the application to display a tree view of zero or more datastores, including any resources therein.

6. The graphical user interface of claim 5, wherein the tree view includes one or more functions selected from a group of functions comprising:

(1) expanding and collapsing a tree node,
    (2) displaying the expanded and collapsed tree node,
    (3) displaying a child node of a selected tree node,
    (4) displaying a parent node of a selected tree node,
    (5) displaying a root object of the tree view,
    (6) displaying a selected node from the tree view,
    (7) searching for a tree node from a given node or from a root node.

7. The graphical user interface of claim 2, wherein the container view provides a mechanism for the Application to display a container view of a selected node from the tree view.

8. The graphical user interface of claim 7, wherein the container view includes one or more functions selected from a group of functions comprising:

(1) expanding the container view,
    (2) refreshing the container view,
    (3) reloading the container view,
    (4) searching the container view for an item,
    (5) sorting the container view,
    (6) setting the container view to a detail view,
    (7) setting the container view to an iconic view, and
    (8) selecting an item in the container view.

9. The graphical user interface of claim 7, wherein the container view is displayed adjacent a tree view and responds to operations performed therein, as well as operations performed within the container view.

10. The graphical user interface of claim 2, wherein the status bar provides a mechanism for the application to display a status of an operation being performed by the application.

11. The graphical user interface of claim 1, wherein each datastore is represented by a Common Server object.

12. The graphical user interface of claim 11, wherein each Common Server object has its own menu bat, toolbar, tree view, and container view.

13. The graphical user interface of claim 11, wherein each Common Server object is comprised of zero or more Common Objects that represent the various resources in the datastores.

14. The graphical user interface of claim 13, wherein each Common Object represents a resource within the Common Server.

15. The graphical user interface of claim 13, wherein each Common Object represents a display entity within both a tree view and a container view.

16. A method for managing and administering a plurality of heterogeneous datastores, comprising:

interfacing an extensible, object-oriented graphical user interface (GUI) framework with an application, wherein the GUI framework provides a consistent look and feel for the application and the application manages and administers the plurality of heterogeneous datastores, and the GUI framework provides a consistent look and feel for the heterogeneous datastores accessed by the application; and extending the GUI framework by means of a plug-in facility in the GUI framework through which support for additional datastores can be added, so that the plurality of heterogeneous datastores can be managed by the application using one consistent user interface, wherein the GUI framework includes a list of datastores accessible from the application and the datastore list provides a mechanism for the application to maintain a list of zero or more connected datastores.

17. The method of claim 16, wherein the GUI framework further, includes one or more components selected from a group comprising:

(1) a customizable menu bar, (2) a customizable toolbar, (3) a tree view, (4) a container view, (5) a status bar with optional progress bar, and (6) find facilities for searching the concert.

18. The method of claim 17, wherein the menu bar provides a mechanism for the application to modify a default menu bar of the GUI framework.

19. The method of claim 17, wherein the toolbar provides a mechanism for the application to modify a default toolbar of the GUI framework.

20. The method of claim 17, wherein the tree view provides a mechanism for the application to display a tree view of zero or more datastores, including any resources therein.

21. The method of claim 20, wherein the tree view includes one or more functions selected from a group of functions comparing:

(1) expanding and collapsing a tree node, (2) displaying the expanded and collapsed tree node, (3) displaying a child node of a selected tree node, (4) displaying a parent node of a selected tree node, (5) displaying a root object of the tree view, (6) displaying a selected node from the tree view, (7) searching for a tree node from a given node or from a root node.

22. The method of claim 17, wherein the container view provides a mechanism for the Application to display a container view of a selected node from the tree view.

23. The method of claim 22, wherein the container view includes one or more functions selected from a group of functions comprising:

(1) expanding the container view, (2) refreshing the container view, (3) reloading the container view, (4) searching the container view for an item, (5) sorting the container view, (6) setting the container view to a detail view, (7) setting the container view to an iconic views and (8) selecting an item in the container view.

24. The method of claim 22, wherein the container view is displayed adjacent a tree view and responds to operations performed therein, as well as operations performed within the container view.

25. The method of claim 17, wherein the status bar provides a mechanism for the application to display a status of an operation being performed by the application.

26. The method of claim 17, wherein each datastore is represented by a Common Server object.

27. The method of claim 26, wherein each Common Server object has its own menu bar, toolbar, tree view, and container view.

28. The method of claim 26, wherein each Common Server object is comprised of zero or more Common Objects that represent the various resources in the datastores.

29. The method of claim 28, wherein each Common Object represents a resource within the Common Server.

30. The method of claim 28, wherein each Common Object represents a display entity within both a tree view and a container view.

31. An article of manufacture embodying logic for a method for managing and administering a plurality of heterogeneous datastores, the method comprising interfacing an extensible, object-oriented graphical user interface (GUI) framework with an application, wherein the GUI framework provides a consistent look and feel for the application and the application manages and administers the plurality of heterogeneous datastores, and the GUI framework provides a consistent look and feel for the heterogeneous datastores accessed by the application; and extending the GUI framework by means of a plug-in fact in the GUI framework through which support for additional datastores can be added, so that the plurality of heterogeneous datastores can be managed by the application using one consistent user interface, wherein the GUI framework includes a list of datastores accessible from the application and the datastore list provides a mechanism for the application to maintain a list of zero or more connected datastores.

32. The graphical user interface of claim 31, wherein the GUI framework further includes one or more components selected from a group comprising:

(1) a customizable menu bar, (2) a customizable toolbar, (3) a tree view, (4) a container view, (5) a status bar with optional progress bar, and (6) find facilities for searching the container.

33. The method of claim 32, wherein the menu bar provides a mechanism for the application to modify a default menu bar of the GUI framework.

34. The method of claim 32, wherein the toolbar provides a mechanism for the application to modify a default toolbar of the GUI framework.

35. The method of claim 32, wherein the tree view provides a mechanism for the application to display a tree view of zero or more datastores, including any resources therein.

36. The method of claim 35, wherein the tree view includes one or more functions selected from a group of functions comprising:

(1) expanding and collapsing a tree node, (2) displaying the expanded and collapsed tree node, (3) displaying a child node of a selected tree node, (4) displaying a parent node of a selected tree node, (5) displaying a root object of the tree view, (6) displaying a selected node from the tree view, (7) searching for a tree node from a given node or from a root node.

37. The method of claim 32, wherein the container view provides a mechanism for the Application to display a container view of a selected node from the tree view.

38. The method of claim 37, wherein the contain view includes one or mote functions selected from a group of functions comprising:

(1) expanding the container view, (2) refreshing the container view, (3) reloading the container view, (4) searching the container view for an item, (5) sorting the container view, (6) setting the container view to a detail view, (7) setting the container view to an iconic view, and (8) selecting an item in the container view.

39. The method of claim 37, wherein the container view is displayed adjacent a tree view and responds to operations performed therein, as well as operations performed within the container view.

40. The method of claim 32, wherein the status bar provides a mechanism for the application to display a status of an operation being performed by the application.

41. The method of claim 32, wherein each datastore is represented by a Common Server object.

42. The method of claim 41, wherein each Common Server object has its own menu bar, toolbar, tree view, and container view.

43. The method of claim 41, wherein each Common Server object is comprised of zero or more Common Objects that represent the various resources in the datastores.

44. The method of claim 43, wherein each Common Object represents a resource within the Common Server.

45. The method of claim 43, wherein each Common Object represents a display entity within both a tree view and a container view.

* * * * *

UNITED STATES PATENT AND TRADEMARK OFFICE
CERTIFICATE OF CORRECTION

PATENT NO. : 6,628,305 B1 Page 1 of 1
DATED : September 30, 2003
INVENTOR(S) : Christine M. Hong et al.

It is certified that error appears in the above-identified patent and that said Letters Patent is hereby corrected as shown below:

Column 9,
Line 42, "aged" should read -- managed --.
Line 48, "die" should read -- the --.

Column 11,
Line 14, "concert" should read -- container --.

Column 12,
Line 17, "fact" should read -- facility --.
Line 62, "contain" should read -- container --.
Line 63, "mote" should read -- more --.

Signed and Sealed this

Second Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,628,305 B1
DATED : September 30, 2003
INVENTOR(S) : Christine M. Hong et al.

It is certified that error appears in the above-identified patent and that said Letters Patent is hereby corrected as shown below:

Title page,
Item [56], References Cited, U.S. PATENT DOCUMENTS, reference "429,882 A * 6/1890 Burnett......126/369.1" should read -- 6,429,882 * 8/2002 Abdelnur, et al...... 345/763 --.

Signed and Sealed this

Sixth Day of July, 2004

JON W. DUDAS
*Acting Director of the United States Patent and Trademark Office*